United States Patent [19]
Braatz et al.

[11] Patent Number: 5,039,458
[45] Date of Patent: Aug. 13, 1991

[54] METHOD OF MAKING A HYDROPHILIC, BIOCOMPATIBLE, PROTEIN NON-ADSORPTIVE CONTACT LENS

[75] Inventors: James A. Braatz, Rockville; Clifton L. Kehr, Silver Spring, both of Md.

[73] Assignee: W. R. Grace & Co.-Conn., New York, N.Y.

[21] Appl. No.: 432,833

[22] Filed: Nov. 7, 1989

Related U.S. Application Data

[60] Division of Ser. No. 312,331, Feb. 16, 1989, Pat. No. 4,886,866, which is a continuation of Ser. No. 135,878, Dec. 21, 1987, abandoned, which is a continuation-in-part of Ser. No. 932,080, Nov. 18, 1986, abandoned, and Ser. No. 409,971, Sep. 18, 1989, which is a continuation-in-part of Ser. No. 300,765, Jan. 23, 1989, abandoned, which is a continuation of Ser. No. 130,826, Dec. 9, 1987, abandoned, which is a continuation-in-part of Ser. No. 932,080, Nov. 18, 1986, abandoned.

[51] Int. Cl.⁵ .......................................... B29D 11/00
[52] U.S. Cl. .................................... 264/2.6; 264/2.7
[58] Field of Search .................. 264/1.1, 1.7, 2.6, 2.7, 264/129, 236; 427/164, 393.5; 523/106

[56] References Cited

U.S. PATENT DOCUMENTS

| | | | |
|---|---|---|---|
| 3,786,034 | 1/1974 | Blair et al. | 264/2.6 X |
| 3,821,136 | 6/1974 | Hudgin et al. | 527/302 |
| 3,822,238 | 7/1974 | Blair et al. | 528/59 |
| 3,939,105 | 2/1976 | Jones, Jr. et al. | 521/63 |
| 4,255,550 | 3/1981 | Gould | 528/44 |
| 4,259,467 | 3/1981 | Keogh et al. | 264/1.1 X |
| 4,359,558 | 11/1982 | Gould et al. | 525/454 |
| 4,403,083 | 9/1983 | Marans et al. | 528/44 |
| 4,408,023 | 10/1983 | Gould et al. | 525/454 |
| 4,435,450 | 3/1984 | Coleman | 427/164 X |
| 4,454,309 | 6/1984 | Gould et al. | 525/454 |
| 4,490,423 | 12/1984 | Gould et al. | 428/35.7 |
| 4,496,535 | 1/1985 | Gould et al. | 424/402 |
| 4,644,033 | 2/1987 | Gnanou et al. | 524/590 |
| 4,687,816 | 8/1987 | Lin et al. | 523/106 X |
| 4,780,488 | 10/1988 | Su et al. | 523/106 |
| 4,794,090 | 12/1988 | Parham et al. | 436/531 |
| 4,857,606 | 8/1989 | Su et al. | 523/106 X |
| 4,871,785 | 10/1989 | Froix | 523/106 |

Primary Examiner—Leo B. Tentoni
Attorney, Agent, or Firm—Beverly K. Johnson; Charles A. Cross

[57] ABSTRACT

A method of preparing a hydrophilic, biocompatible contact lens characterized by a surface which resists nonspecific protein adsorption. The method involves forming a prepolymer, at least 75% of which are oxyethylene-based diols and polyols having molecular weights of about 7000 to about 30,000. The prepolymer is subsequently gelled and hydrated to produce a hydrated polyurea-polyurethane polymer gel. The hydrated polymer gel is used to obtain a contact lens which resists nonspecific protein adsorption. Preferably, the contact lens are prepared by molding the prepolymer into a contact lens mold, prior to polymerization, to achieve the desired lens shape.

8 Claims, 1 Drawing Sheet

ADSORPTION OF ALKALINE PHOSPHATASE
BY HYDRATED POLYMERS

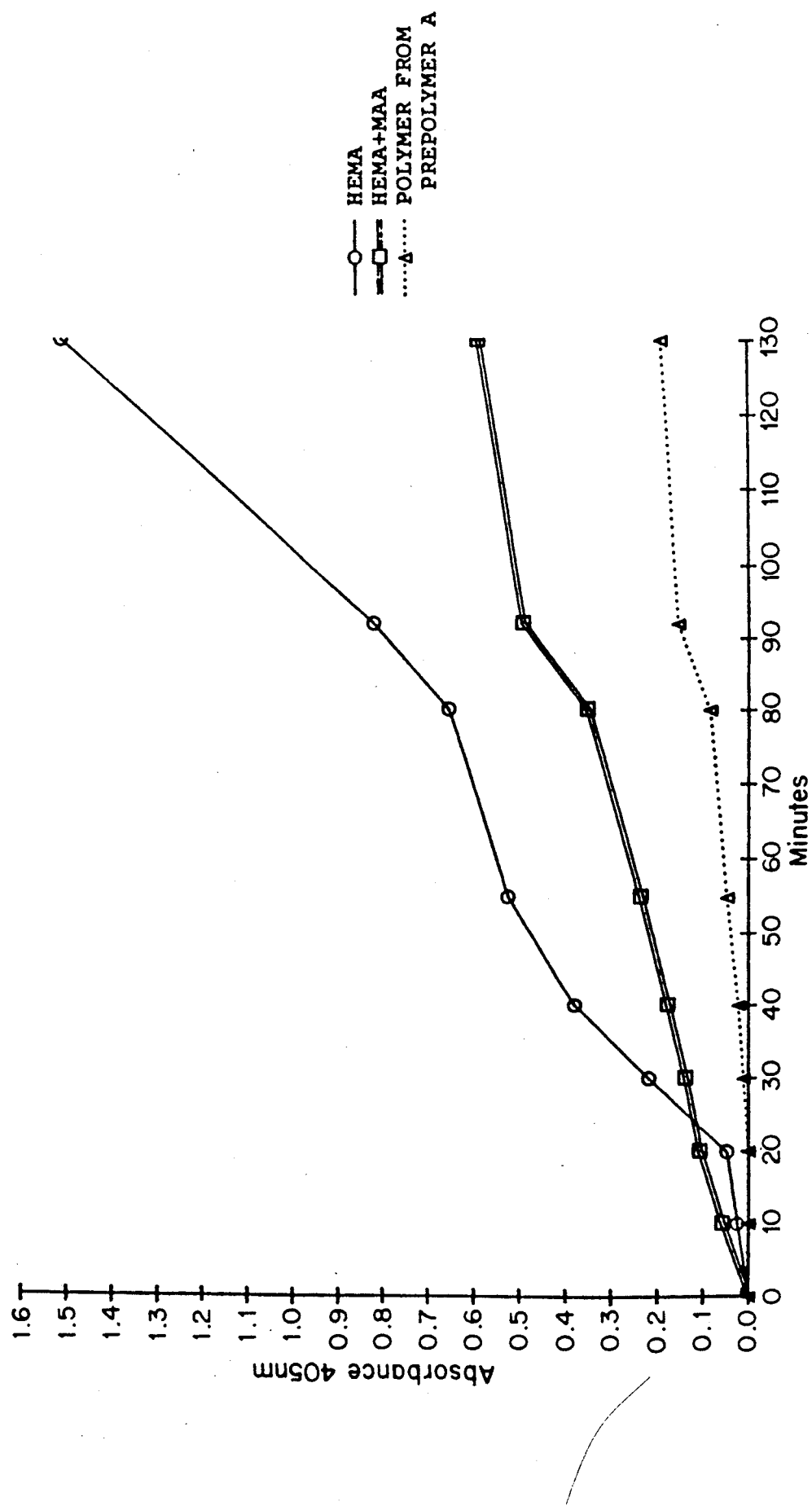

METHOD OF MAKING A HYDROPHILIC, BIOCOMPATIBLE, PROTEIN NON-ADSORPTIVE CONTACT LENS

This is a divisional application of Ser. No. 312,331, filed Feb. 16, 1989, now U.S. Pat. No. 4,886,866; which is a continuation of Ser. No. 135,878, filed Dec. 21, 1987, now abandoned; which is a continuation-in-part of (1) Ser. No. 932,080, filed Nov. 18, 1986, now abandoned, and (2) copending application having a Ser. No. 409,9071, filed Sept. 18, 1989; which is a continuation-in-part of Ser. No. 300,765, filed Jan. 23, 1989, now abandoned; which is a continuation of Ser. No. 130,826, filed Dec. 9, 1987, now abandoned; which is a continuation-in-part of Ser. No. 932,080, filed Nov. 18, 1986 mentioned above.

BACKGROUND OF THE INVENTION

This invention relates to the preparation of soft contact lenses for optical correction, based on synthetic hydrated polymers. More specifically, a unique series of crosslinked polyurethane and polyurea-urethane polymer gels is found to be particularly suitable for this purpose. These polymers are formed from high molecular weight isocyanate end-capped prepolymers which are substantially comprised of ethylene oxide units. These hydrophilic polymers are characterized by their biocompatibility and by their exhibiting a unique surface which resists nonspecific protein adsorption.

Numerous polyurethane polymers have been previously identified. Quite a few hydrogel polymers, prepared from various prepolymers, have been prepared and used for widely varying applications. Typically, hydrogels are formed by polymerizing a hydrophilic monomer in an aqueous solution under conditions such that the prepolymer becomes crosslinked, forming a three-dimensional polymeric network which gels the solution. Polyurethane hydrogels are formed by polymerization of isocyanate-end capped prepolymers to create urea and urethane linkages.

Polymer-based soft contact lenses are not new. U.S. Pat. No. 4,259,467 (Keogh et al.) discloses hydrophilic contact lenses prepared from the polymerization of polysiloxane monomers. U.S. Pat. No. 4,113,685 (Holcombe, Jr.) discloses hydrophilic contact lenses prepared from a copolymer of 2-hydroxyethyl methacrylate, isobutyl methacrylate, trimethylolpropane, trimethylacrylate, methacrylic acid, 2,5-dimethyl-2,5-bis-(2-ethyl hexoylperoxy)hexane.

A number of references disclose the use of polyurethane polymers or copolymers. U.S. Pat. No. 3,786,034 (Blair et al.) discloses the use of water absorptive polyurethane polymers of resins of low equivalent weight and high molecular weight and slightly in excess of equimolar ratios of polyisocyanates or urethane linkage precursors for soft contact lenses. U.S. Pat. No. 4,359,558 (Gould et al.) discloses polyurethane diacrylate compositions for contact lenses, and U.S. Pat. No. 4,454,309 (Gould et al.) discloses polyurethane polyene compositions in which the polyene may be a polyacrylate. U.S. Pat. No. 4,255,550 (Gould) discloses the manufacture of contact lenses from polyurethane resins derived from polymers characterized by lactone groups and hydroxyl groups in the polymer backbone.

Prior art hydrogels tend to adsorb proteins from solutions with which they are brought into contact. This is a particular problem in attempting to utilize polymeric hydrogels for health care applications, such as contact lenses, where proteins are omnipresent. The result may be occlusion or clogging of the polymer, clouding, contamination, irritation to adjacent body tissues, or loss of tissue or bodily fluid protein by irreversible adsorption or denaturation.

SUMMARY OF THE INVENTION

The polymer system used in this invention provides hydrated polyurethane and polyurea-urethane polymer gels with highly desirable properties which make them particularly well suited for use in the preparation of contact lenses. The polymers are prepared from solutions of high molecular weight isocyanate end-capped prepolymers substantially or exclusively comprised of ethylene oxide units. The terms gel or hydrogel are meant to refer to polymers which are non-foamed in structure.

It is one of the primary objects of this invention to provide hydrophilic, biocompatible polymeric materials suited for the preparation of contact lenses. It is a related object to provide contact lens materials which can be shaped for the desired optical correction and which are physically durable under normal use. Another object is to provide lenses which have good oxygen permeability.

It is a further object to provide polymeric surfaces which are hydrophilic and yet display marked resistance to the nonspecific adsorption or binding of proteins.

An additional object is to provide transparent contact lens materials which can be either steam or chemically sterilized without undergoing an increase in opacity.

DESCRIPTION OF THE DRAWINGS

FIG. 1 is a graph representing a plot of absorbance versus time in Example XVIII, and demonstrates the resistance to protein binding shown by the hydrated polymers used in this invention.

DETAILED DESCRIPTION OF THE INVENTION

A new class of hydrophilic polyurethane prepolymers and related crosslinked hydrated polymers has been found for use in the manufacture of contact lenses which are uniquely characterized by biocompatibility and resistance to nonspecific protein adsorption. These hydrophilic biocompatible contact lenses comprise hydrated polymers derived from polymeric monomer units (the prepolymer units) at least 75% of which are oxyethylene-based diols or polyols having molecular weights of about 7000 to about 30,000, with essentially all of the hydroxyl groups of these diols or polyols capped with polyisocyanate. The prepolymers useful in this invention are prepared by reacting the selected diols or polyols with polyisocyanate at an isocyanate-to-hydroxyl ratio of about 1.8 to about 2.2 so that essentially all of the hydroxyl groups of the polyols are capped with polyisocyanate. Polymerization to gel the prepolymer solution may be accomplished by contact with water to yield a polyurea-urethane polymer or with another crosslinking agent to yield a polyurethane polymer. Shaped gels are conveniently made in this manner.

Preparation of the Prepolymer

The diols and polyols used in this invention predominantly or exclusively are polyoxyalkylene diols or polyols made up of ethylene oxide monomer units. At least 75% of the units should be ethylene oxide, preferably at least 90%, and more preferably at least 95%. Most preferably, substantially all or all of the units should be ethylene oxide. Conventional urethane polymer hydrogel systems typically require inclusion of substantial proportions of propylene oxide or butylene oxide units in the polyols and derivative prepolymers to ensure that they will be liquid or pasty at room temperature. Alternatively, solid or crystalline polyols and derivative prepolymers must be heated to their melting point in order to be handled for use in conventional systems. These requirements are avoided by the present invention. Even 100% ethylene oxide diols or polyols and the derivative prepolymers may be accommodated. Extremely high ethylene oxide content (i.e., greater than 90 or 95%) is in fact preferred, with 100% ethylene oxide-based diols or polyols and derivative prepolymers being the most preferred for this invention.

High molecular weight ethylene oxide-based diols and polyols are used to prepare the prepolymers and hydrated polymers of the present invention. The diol or polyol molecular weight prior to capping with polyisocyanate should be at least about 7000 to 8000 MW, preferably about 10,000 to about 30,000 MW. It is preferred to use trihydroxy compounds (triols) in the preparation of the polyols which are the precursors to the prepolymers and hydrated polymers of this invention. For example, glycerol is a preferred triol. Trimethylolpropane (TMOP), trimethylolethane and triethanolamine are other suitable triols. In addition, tetrols, such as pentaerithritol, may be used to prepare polyols for use in this invention. Triol- or tetrol-based polyols are capped with difunctional or polyfunctional isocyanate compounds as described below to form the prepolymer.

Alternatively, diols of appropriate molecular weight may be used as precursors to the prepolymers of this invention. Diols of appropriate molecular weight are capped with polyfunctional isocyanates as described below to form the prepolymers. High molecular weight polyethylene glycols are particularly useful. Especially desirable in this embodiment are polyethylene glycols of the formula $H(OCH_2CH_2)_xOH$ where x is an average number such that the glycol has an average molecular weight of at least about 7000, preferably about 10,000 to about 30,000. Alternatively, diols may be capped with diisocyanates and used in conjunction with crosslinking compounds to form the hydrated polymers described herein. Crosslinking compounds useful for this purpose include polyfunctional alcohols, amines and polyfunctional isocyanates. In still another alternative embodiment, diols may be mixed with polyols and the resulting mixture reacted with isocyanates to produce the prepolymer of this invention.

The prepolymers of this invention are formed by reacting the hydroxyl groups of the diols or polyols described above with polyisocyanates "Polyisocyanate" as used herein is intended to refer to both diisocyanates and polyisocyanates, as appropriate, except as indicated by specifying the use of difunctional or polyfunctional isocyanates. Isocyanate end-capped (i.e., isocyanate-terminated) prepolymers are formed. The choice of the polyisocyanate will depend on such factors as selection of the precursor to the prepolymer (i.e., polyol or diol), the degree of handling or shaping required in preparing the polymer, and the anticipated end use of the hydrated, crosslinked polymeric structure.

The selected precursor to the prepolymer influences the choice of polyisocyanate in that the prepolymer structure must lend itself to sufficient crosslinking to gel an aqueous prepolymer solution or to form a crosslinked polymeric coating. In the embodiment in which the precursors to the prepolymers are polyols (that is, triol-based or tetrol-based), difunctional isocyanates are preferred. If desired, polyfunctional isocyanate compounds may also be used with polyols. Mixtures of suitable isocyanates also may be considered.

Where diols are used as the precursors to the prepolymers, they may be reacted with polyfunctional isocyanate compounds to form the prepolymers of this invention. This combination yields prepolymers having sufficient functional groups for crosslinking in the formation of the hydrated polymer. In an alternative embodiment using diols as the precursors to the prepolymers, the diols may be capped with a difunctional isocyanate. In order to achieve sufficient crosslinking in the hydrated polymer prepared from these difunctional prepolymers, they are used in conjunction with a crosslinking compound. The preferred crosslinker is trimethylolpropane ("TMOP"), although others may be used, for example, glycerol, trimethylolethane, pentaerythritol, triethanolamine, polyfunctional amines, polyfunctional isocyanates, and the like.

Aromatic, aliphatic or cycloaliphatic polyisocyanates may be used in any of the above-described embodiments. The use of aliphatic polyisocyanates permits a greater degree of handling and/or shaping since aliphatic isocyanate-capped prepolymers typically require about 20 to 90 minutes to gel to a hydrated polymer state By contrast, prepolymers capped with aromatic polyisocyanates will gel more rapidly, in about 30 to 60 seconds. In addition, aliphatic polyisocyanates will be preferred because of decreased toxicological considerations. However, hydrated polymers made using aromatic or araliphatic polyisocyanates in the prepolymer are also useful.

Examples of suitable di- and polyfunctional isocyanates are found in the following list:
toluene-2,4-diisocyanate
toluene-2,6-diisocyanate
commercial mixtures of toluene-2,4 and 2,6-diisocyanates
isophorone diisocyanate
ethylene diisocyanate
ethylidene diisocyanate
propylene-1,2-diisocyanate
cyclohexylene-1,2-diisocyanate
cyclohexylene-1,4-diisocyanate
m-phenylene diisocyanate
3,3'-diphenyl-4,4'-biphenylene diisocyanate
4,4'-biphenylene diisocyanate
4,4'-diphenylmethane diisocyanate
3,3'-dichloro-4,4'-biphenylene diisocyanate
1,6-hexamethylene diisocyanate
1,4-tetramethylene diisocyanate
1,10-decamethylene diisocyanate
cumene-2,4-diisocyanate
1,5-napthalene diisocyanate
methylene dicyclohexyl diisocyanate
1,4-cyclohexylene diisocyanate
p-tetramethyl xylylene diisocyanate
p-phenylene diisocyanate
4-methoxy-1,3-phenylene diisocyanate
4-chloro-1,3-phenylene diisocyanate
4-bromo-1,3-phenylene diisocyanate 4-ethoxy-1,3-phenylene diisocyante
2,4-dimethyl-1,3-phenylene diisocyante
5,6-dimethyl-1,3-phenylene diisocyanate
2,4-diisocyanatodiphenylether
4,4'-diisocyanatodiphenylether
benzidine diisocyanate
4,6-dimethyl-1,3-phenylene diisocyanate
9,10-anthracene diisocyanate
4,4'-diisocyanatodibenzyl
3,3'-dimethyl-4,4'-diisocyanatodiphenylmethane
2,6-dimethyl-4,4'-diisocyanatodiphenyl
2,4-diisocyanatostilbene
3,3'-dimethoxy-4,4'-diisocyanatodiphenyl
1,4-anthracenediisocyanate
2,5-fluorenediisocyanate
1,8-naphthalene diisocyanate
2,6-diisocyanatobenzfuran
2,4,6-toluene triisocyanate
p,p',p"-triphenylmethane triisocyanate
trifunctional trimer (isocyanurate) of isophorone diisocyanate
trifunctional biuret of hexamethylene diisocyanate
trifunctional trimer (isocyanurate) of hexamethylene diisocyanate
polymeric 4,4'-diphenylmethane diisocyanate
xylylene diisocyanate
m-tetramethyl xylylene diisocyanate Capping of the selected diols or polyols with polyisocyanates to form the prepolymers of this invention is effected using stoichiometric amounts of reactants. The isocyanate-to-hydroxyl group ratio preferably should be between about 1.8 and about 2.2. Higher ratios may be used but are not preferred since they may lead to problems associated with excessive monomer present in the final products. The capping reaction may be by any convenient method or procedure. For example, the reaction may be carried out at about 20° to about 150° C., under dry nitrogen, for about 2 hours to about 14 days, preferably in the absence of a catalyst. The preferred temperature is about 60° to 100° C. The reaction is terminated when the isocyanate concentration approximates theoretical values The time period will be a function of the polyisocyanate used and the temperature at which the reaction is conducted. Polymerization occurs much more rapidly when aromatic polyisocyanates are used than with aliphatic polyisocyanates. Similarly, the reaction will be more rapid with increased temperatures.

It is preferred to avoid using an excess of polyisocyanate in preparing the prepolymer. Preferably, an isocyanate-to-hydroxyl group ratio of 2:1 (for example, one diisocyanate molecule per hydroxyl group of the polyol) is used to ensure complete end-capping of the polyol. Complete end-capping eliminates excessively high viscosity in the prepolymer by avoiding undue amounts of chain extension. However, a slight excess of isocyanate, i.e., up to about ten percent, can be used. Prepolymer reaction catalysts may be used, but it is preferred for toxicological reasons to conduct the reactions without the use of catalysts, trace residues of which may remain in the contact lens products.

It is characteristic of the present polymer system that the isocyanate content is very low. This is achieved by employing high molecular weight polyols and by avoiding excessive quantities of isocyanate in the end-capping reaction so that free isocyanate monomers are unlikely to be present. The isocyanate concentration in the prepolymer should be about 0.1 to about 0.5 milliequivalents per gram, for prepolymers formed from diols or polyols of about 7,000 to 30,000 MW.

Notwithstanding a preference for low isocyanate content, the polymer system described herein affords a greater degree of flexibility in this regard than conventional systems. The presence of an organic solvent in preparing and handling the prepolymer protects against excessive viscosity resulting from the use of insufficient quantities of isocyanate for complete end-capping of the diol or polyol. That is, it permits the use of less than stoichiometric (2:1) quantities of the isocyanate monomer. Chain extension resulting from incomplete end-capping typically results in increased viscosity which may make handling of the prepolymer difficult or impossible. By contrast, the system of this invention tends not to be affected negatively by increased viscosity due to chain extension, or from any other cause, because the solvent serves to maintain the viscosity within a range suitable for convenient handling of the prepolymer.

The organic solvent used in preparing the prepolymer must be compatible with the reactants and with the end use desired for the hydrated polymer. Primarily, the solvent must be one in which the diol or polyol and/or prepolymer can be readily dissolved, preferably at ambient temperatures. Suitable aprotic solvents for preparing the prepolymer include tetrahydrofuran, dioxane, dimethyl formamide, dimethyl sulfoxide, dichloromethane, acetone, butyrolactone and methyl ethyl ketone, or mixtures thereof. Tetrahydrofuran is preferred. Acetonitrile is a technically suitable solvent, but for toxicological reasons should only be used in this application if the hydrated polymer material is thoroughly washed or otherwise treated (e.g., by evaporation) to remove all traces of the solvent.

In one embodiment using an organic solvent, the diol or polyol itself is dissolved in the solvent and is reacted with polyisocyanate while in solution to yield the isocyanate end-capped prepolymer. This embodiment is particularly preferred where the diol or polyol is solid or crystalline at ambient temperatures, that is, for diols or polyols substantially or exclusively comprised of ethylene oxide units and for high molecular weight diols or polyols. In this manner, even crystalline diols or polyols can easily be handled without heating to their respective melting points. Even though the prepolymer formation reaction is conducted at elevated temperatures, utilizing an organic solvent to first place the diol or polyol in liquid form assures good reaction and prepolymer formation.

In another embodiment using an organic solvent, the isocyanate end-capped prepolymer first is prepared neat and then is dissolved in an organic solvent, such as those listed above. This embodiment will be useful where the diol or polyol already is liquid or pasty at ambient temperatures and does not require dissolution in order to prepare the prepolymer. For example, diols or polyols of lower molecular weight or higher propylene oxide or butylene oxide content may be treated in this manner. Use of a solvent at the prepolymer stage is advantageous where increased viscosity occurs due to chain extension of incompletely end-capped diols or polyols.

Preparation of the Hydrated Polymer

Polymerization of the prepolymer (the isocyanate-capped diol or polyol) in water or an aqueous solution acts to gel the prepolymer solution or a deposited layer of the prepolymer forming a polyurea-urethane hydrated polymer. Alternatively, a prepolymer/solvent solution may be polymerized in the absence of water, forming a polyurethane polymer, followed by substitution of the solvent with water or an aqueous solution to hydrate the polymer. With use of the latter alternative (i.e., polymerizing in the absence of water), there will be less swelling of the hydrated polymer than where the prepolymer is polymerized directly in water or an aqueous solution.

Polymerization in Water—Gelling or curing in an aqueous system is accomplished by the addition of a stoichiometric equivalent or excess of water or aqueous solution, relative to the total available isocyanate groups. Preferably, water alone is used to prepare the aqueous prepolymer solution, but solutes or particulates may be present, if desired. Solutes which react with the isocyanate groups will tend to become an integral part of the hydrogel. Care should be taken with such solutes since too high a concentration may result in excessive end-capping of the prepolymer to such an extent that polymerization will be precluded. Typically, a prepolymer-aqueous solution may be prepared, with or without an organic solvent, to initiate polymerization and curing. Where gelling is accomplished with water or an aqueous solution, gelling and hydration of the polymer occur as a simultaneous step.

For the embodiment in which an aqueous prepolymer solution is made, the prepolymer-to-water ratio should be about 1:1 to about 1:20, preferably about 1:5 to about 1:15. Gelling time increases as the proportion of prepolymer in the aqueous solution decreases. The solution should be stirred or agitated until completely mixed.

Polymerization begins to occur spontaneously with contact of the isocyanate groups of the prepolymer with the water. Water may be mixed with the prepolymer to form a gel, or atmospheric moisture may be utilized for polymerization. Through the addition of water to the prepolymer amines are generated, through which urea linkages are formed as polymerization proceeds. The final polymer product is a polyurea-urethane. The presence of urea linkages significantly increases the strength of the final polymer product. In this application, the contact lenses will exhibit greater strength, i.e., durability against accidental tearing. Catalysts or crosslinking agents other than water are not required but are considered optional Catalysts may be used if means are taken to avoid toxicological problems with the end products (i.e., soaking in water or buffer to remove the catalyst). Suitable catalysts include organic tin salts (e.g., dibutyltin dilaurate) and tertiary amines (e.g., triethylenediamine). Suitable crosslinking agents include di- and polyhydric alcohols, primary and secondary polyamines and di- and polyfunctional isocyanates As used herein, "polyhydric" shall also include "dihydric" and "polyfunctional" shall also include "difunctional". Crosslinking agents preferably are employed in stoichiometric or near stoichiometric amounts, although the exact proportions are not critical.

As polymerization begins to occur, gelling takes place. Prior to gelling, the prepolymer solution may be shaped, poured or handled as necessary. At the gelling stage, the hydrated polymer takes on the physical form of the final cured product, forming a monolithic elastic matrix, although unreacted isocyanate groups still will be present. Gelling time may be on the order of from about thirty seconds to about one hour, or more, and will vary with temperature. Upon gelation, the mixture loses its ability to flow, becoming a jelly-like solid or semi-solid mass. The polymer continues curing until the chemical reaction of all residual isocyanate groups is complete or approaches completion. Complete reaction may take hours, days or weeks, depending on the conditions and the polyisocyanate used. The curing time may be shortened by addition of catalysts or chain terminating or inactivation agents, such as ethanolamine, which cause end-capping without chain extension.

To set the shape of the hydrated polymer, only gelation is required However, complete or substantially complete curing is necessary in order to produce a hydrated polymer which completely resists nonspecific protein binding. Complete isocyanate reaction may be ensured by soaking the polymer in water to reduce or eliminate the availability of residual isocyanate groups, or by incorporating chain terminating agents as described above. This eliminates residual isocyanate groups which may bind proteins which come into contact with the hydrated polymer.

Gelling and curing time will vary, depending in part on the concentration of prepolymer present in the aqueous solution from which the hydrated polymer is formed. Gelling time decreases with higher prepolymer concentrations. In addition, gelling time depends on the type of polyisocyanate used in preparing the prepolymer. Aromatic polyisocyanate end-capped prepolymers will gel rapidly, usually reacting in somewhat less than one minute, although the curing time may be longer. Prepolymers capped with aliphatic polyisocyanates have a longer gelling time, typically about 20 to 90 minutes, and may take from up to several hours to several weeks for complete curing. However, catalysts may be used to accelerate both the gelling and the curing reactions. If desired, the hydrated polymer may be subjected to a drying step.

In addition, organic solvents are useful in preparing the hydrated polymer of this invention. During polymerization, the presence of a solvent enables the system to tolerate higher levels of excess isocyanate (over stoichiometric amounts) without causing disruption of the hydrated polymer formation. Carton dioxide formed by the reaction of excess isocyanate monomer and water simply effervesces due to the system's low viscosity, rather than becoming entrapped to elicit foam formation. The solvents listed above as being suitable for use in preparing the prepolymer may also be used here. In addition, methanol, ethanol and 2-propanol, or mixtures thereof, may be used when the prepolymer is end-capped with aliphatic or cycloaliphatic isocyanate.

If an organic solvent is used in the preparation of the prepolymer or hydrated polymer, it most frequently will be removed prior to use of the polymer. Aprotic solvents are most suitable. Protic solvents, such as alcohols, may be used if desired. The solvent may be removed from the prepolymer prior to curing or may be allowed to evaporate during the process of forming the prepolymer into the desired shape. In most cases where curing is accomplished in the presence of the solvent, the solvent is removed from the hydrated polymer after curing by evaporation, displacement, water washing, etc. In these cases, it is necessary to use a solvent which is water soluble or water-miscible. The organic solvent-prepolymer solution then will be compatible with the water or aqueous solution in which the hydrated polymer will be formed, thereby resulting in an aqueous prepolymer solution, not an emulsion or dispersion. Where polymerization is accomplished in a non-aqueous solvent, the polymer is hydrated in a subsequent step.

Non-Aqueous Polymerization—Where polymerization is initiated in the absence of water, a polymerization initiator is added to the prepolymer/solvent solution. For example, polymerization can be intiated by addition of polyhydric, lower molecular weight, —NCO reactive materials such as glycols (e.g., ethylene glycol, proplyene glycol, tripropylene glycol, etc.), triols (e.g., glycerol, trimethylolpropane, etc.), tetrols (e.g., pentaerythritol, etc.), hexols and the like. A polyurethane polymer is formed. The polymer may then be hydrated by immersion in water.

Additives—It is within the scope of this invention to modify the properties of the contact lens by use of additives to the prepolymer or to the water or aqueous solution used for formation of the hydrated polymer. For example, it may be desired to add an antioxidation agent at some point prior to polymerization, preferably prior to preparation of the prepolymer. Antioxidants are not required to make or use the prepolymers or hydrated polymers of this invention. However, storage and handling properties may be enhanced by such an addition by preventing oxidative breakdown of the polymer or its precursors. Suitable antioxidants include the hindered phenolic compounds. Specific examples are IRGANOX (TM) (Ciba-Geigy Corp.) and SANTONOX (TM) (Monsanto Chemical Co.). The antioxidant may be added in amounts of about 0.01 to about 1.0%, preferably about 0.02 to about 0.1%, based on the weight of the polyol or precursor to the prepolymer.

Examples of other additives include ultraviolet radiation stabilizers, optical brighteners, preservatives, colorants and strength reinforcing agents. Useful strength reinforcing agents include synthetic or natural polymers and resins that are compatible with the hydrated polymer of this invention and that do not detract significantly from the desirable optical and physiological qualities of the lens. Other additives include catalysts for gelling and curing the hydrated polymer, as well as auxiliary chain extension and crosslinking agents.

Contact Lens Formation—In the preparation of the contact lenses of this invention, the prepolymer solution preferably is introduced into a contact lens mold and polymerized to achieve the desired shape. However, it is also possible to cut the desired lens shape from a polymer sheet, rod, etc., or to machine and polish the lens from a blank. The term "contact lens preform shape" will be used to refer to any of these polymer forms from which a vision-correcting contact lens can be cut, machined and/or polished by mechanical or other means (i.e., laser cutting). Cutting and polishing may be done at ambient conditions or, optionally, at reduced temperatures in order to achieve a more solid structure amenable to machining operations. The aforementioned techniques may be the preferred commercial methods for making the contact lenses of this invention. The preferred experimental method has been the evaporation method described in Example XVI.

In addition, conventional contact lenses (either hydrophilic or hydrophobic) may be treated or coated with the prepolymers described herein, in order to impart to conventional lenses the characteristics of biocompatibility and resistance to nonspecific protein binding associated with the contact lenses of this invention. The conventional lenses are treated with the prepolymer of this invention in such a manner that the lenses become coated with prepolymer. Treatment may be either in an aqueous or nonaqueous solution. The prepolymer coating is then polymerized on the surface of the lens to yield a treated hydrophilic lens with the described properties. Polymerization preferably is initiated with water, or may be initiated with any of the initiators or crosslinking agents discussed above.

Contact Lens Characteristics

The surface properties of the hydrated polymer contact lenses of this invention are unique and offer significant advantages over conventional polymer lenses. In particular, the hydrated polymer lenses of this description are resistant to nonspecific protein adsorption. This feature avoids problems associated with undesirable protein adsorption, such as cloud formation, occlusion, etc. As a result, the contact lenses of this invention will have longer useful lives.

The biocompatibility of the hydrated polymers of this invention is related, at least in part, to the polymers' ability to resist protein adsorption. While not limiting the effectiveness of this invention to any specific theory, the unique qualities of these polymers are believed to relate to the use of predominantly or exclusively ethylene oxide-based diols or polyols in the formulation of the prepolymers and hydrated polymers. When the polymers of this invention are used in contact with an aqueous system, the ethylene oxide segments of the polymer attract and complex with water molecules. Consequently, the surface presented to living cells or tissues is predominantly a layer of water. This protective curtain of water renders the underlying synthetic polymeric material noninteractive with proteins. The result is a hydrated polymer which is physiologically acceptable, and which does not remove or denature proteins from the environment in which the polymer is used.

Biocompatibility, as used herein to describe the hydrated polymers of this invention, refers to the resistance to adsorption of protein and to the lack of interactiveness with physiological surfaces, as discussed above. In addition, the hydrated polymers of this invention have been demonstrated to be nontoxic to mammalian cells. Use of aliphatic polyisocyanates in preparation of the prepolymers may further enhance the biocompatibility of the hydrated polymer product since the potential degradation products of aliphatic polyisocyanates are reported to be significantly less likely to be carcinogenic than those of aromatic isocyanates. However, if aromatic polyisocyanates are used, careful washing or other means for removing any unreacted isocyanate and related amine-containing by-products generally will be sufficient to render the hydrated polymer biocompatible.

The finished hydrated polymer is water swellable and is capable of swelling to an extent that it may comprise from about 40 to 50% up to about 95 to 99% water. The volumetric expansion may be tenfold for polymers made with about a 1:5 prepolymer-to-water ratio. Decreasing the relative proportion of prepolymer will allow for increased volumetric expansion. Hydrated polymers made from solutions containing high concentrations of prepolymer versus water tend to form tighter polymeric compositions which are less susceptible to expansion. These lenses will have better strength characteristics. However the higher the water content of the hydrated polymer, the greater the oxygen permeability will be. Contact lenses with high oxygen permeability are preferred, particularly for extended wear vision correction. These two qualities may be balanced as desired.

The hydrated polymers used in this invention are covalently extended and crosslinked and therefore are not readily soluble or degradable in aqueous systems under physiological conditions, which further increases the polymers' suitability for use in or as contact lenses. The physical integrity of the hydrated polymer is maintained when used in an aqueous system, such as the eye, eliminating problems with toxicity and contamination. Moreover, these characteristics make it possible to use the hydrated polymers of this invention in aqueous systems over extended periods with minimal loss of polymer strength or integrity.

The hydrated polymers of this invention give the contact lenses excellent strength, flexibility, resilience and transparency. By "strength" is meant that the lenses are not susceptible to stretching, tearing, etc., under normal wear and handling conditions. By "flexibility" is meant that the lens may be folded, bent or otherwise deformed without breaking or tearing. By "resilience" is meant that after the lens has been deformed it will quickly return to its original shape without exhibiting evidence of having been deformed. By "transparency" is meant that the lenses satisfactorily may be used for optical correction, without inhibitory clouding or reduction in light and image transmission.

In the manufacturing process, the formed contact lenses must be sterilized. This preferably is accomplished by steam sterilization, although chemical sterilization may be employed. Many hydrophilic polymers which would otherwise be good candidates for the preparation of contact lenses have the disadvantage of becoming cloudy or opaque upon exposure to heat, especially in the presence of water or steam. One of the key features of the polymer system described herein is its ability to withstand steam sterilization operations without a permanent loss of transparency. For the preparation of contact lenses which can be treated in this manner, the hydrated polymer should be derived from prepolymer units at least 80% of which are isocyanate-capped oxyethylene-based diols or polyols. For steam-sterilizable lenses, it is more preferred that all or substantially all of the prepolymer units are isocyanate-capped oxyethylene-based diols or polyols.

The examples which follow are given for illustrative purposes and are not meant to limit the invention described herein. The following abbreviations have been used throughout in describing the invention.

A—Angstrom(s)
°C.—degrees Centigrade
cm—centimeter(s)
DMEM—Dulbecco's Modified Eagle's Medium
DI—deionized
F12—F12 cell culture medium
gm—gram(s)
Hg—mercury
IDPI—isophorone diisocyanate
IU—International unit(s)
M—molar
$m^2$—square meter(s)
meq—milliequivalent(s)
mg—milligram(s)
min—minute(s)
ml—milliliter(s)
mm—millimeter(s)
μm—micrometer(s)
MW—molecular weight
ngm—nanogram(s)
PBS—phosphate buffered saline
%—percent
TM—trademark
UV—ultraviolet
v—volume
wt—weight

EXAMPLE I

Preparation of Prepolymer A

The polyol used to prepare the prepolymers of this invention, Pluracol V7 (TM) (BASF), a 7000 MW triol copolymer of ethylene oxide (75%) and propylene oxide (25%), was deionized and dried. Following this deionzation procedure, 1687.46 gm Pluracol V7 was mixed with 165.0 gm isophorone diisocyanate (IDPI) and 0.93 gm SANTONOX R (TM) (Monsanto Chemical Co.) and heated at 70° C. under dry nitrogen. Isocyanate levels were determined by addition of dibutylamine and back titration with standard acid. Fourteen days were required for the isocyanate concentration to reach 0.47 meq/gm (0.39 meq/gm=theoretical). The resulting prepolymer, designated Prepolymer A, was liquid at room temperature.

EXAMPLE II

Preparation of Prepolymer B

A prepolymer was formed by mixing 300.0 gm deionized and dried TPEG10000 (TM) (Union Carbide Corp.) with 22.0 gm IPDI and 0.16 gm SANTONOX R. TPEG10000 is a 10,000 MW triol prepared from 100% homopolymeric ethylene oxide. The mixture was heated at 70° C. under dry nitrogen as in Example I, until isocyanate values reached 0.36 meq/gm (theoretical=0.28 meq/gm). This prepolymer, designated Prepolymer B, formed a solid when cooled to room temperature.

EXAMPLE III

Preparation of Prepolymer C

A prepolymer was formed by mixing 403.0 gm deionized and dried TPEG20000 (TM) (Union Carbide Corp.) with 14.78 gm IPDI and 0.21 gm SANTONOX R. IPEG20000 is a 20,000 MW triol prepared from 100% homopolymeric ethylene oxide. To this mixture 515.0 ml acetonitrile was added to prevent solidification. The resulting mixture was heated as in Example I for eleven days until an isocyanate content of 0.147 meq/gm, corrected for solvent (theoretical=0.145 meq/gm), was reached. The prepolymer (in acetonitrile solution), designated Prepolymer C, was a liquid at room temperature.

EXAMPLE IV

Preparation of Prepolymer D

A prepolymer was prepared as in Example I, using 293.0 gm TPEPG10000 (TM) (Union Carbide Corp.), 23.92 gm IPDI and 0.16 gm SANTONOX R. TPEPG10000 is a 9000 MW triol prepared from 88% ethylene oxide and 12% propylene oxide polymerization monomers. The reactants were dissolved in 293.0 ml acetonitrile and synthesis was conducted as in Example I. After thirteen days the isocyanate content was 0.43 meq/gm (theoretical=0.31 meq/gm). The prepolymer (in acetonitrile solution) was designated Prepolymer D.

EXAMPLE V

Preparation of Prepolymer E

A prepolymer was prepared as in Example I, using 572 gm BASF #46889 (a 7000 MW triol comprised of 80% ethylene oxide and 20% propylene oxide), 59.0 gm IPDI and 0.54 gm SANTONOX R. The reactants were dissolved in 572.0 ml acetonitrile and synthesis was performed as in Example I. After fourteen days the isocyanate content was 0.46 meq/gm (theoretical=0.39 meq/gm). This prepolymer (in acetonitrile solution) was designated Prepolymer E.

EXAMPLE VI

Preparation of Prepolymer F

The prepolymer was prepared by mixing 79.0 gm Pluracol V10 (TM) (BASF) (a 22,000 MW diol comprised of 75% ethylene oxide and 25% propylene oxide), 0.24 gm trimethylolpropane and 2.94 gm IPDI. An antioxidant, IRGANOX 1076 (TM) (Ciba-Geigy Corp.) was added, to 0.05% of the total weight of the reactants (0.041 gm) and 150.0 ml acetonitrile was added to reduce viscosity. The synthesis was performed as in Example I. After eight days the isocyanate concentration was 0.18 meq/gm (theoretical estimated at approximately 0.24 meq/gm). This prepolymer (in acetonitrile solution) was designated Prepolymer F.

EXAMPLE VII

Preparation of Prepolymer G

This prepolymer was prepared by heating to 60° C. a mixture of 0.031 moles homopolymer polyethylene glycol (~8000 MW) and 0.015 moles trimethylolpropane. The preheated mixture was added to 0.11 moles toluene diisocyanate (80% toluene-2,4-diisocyanate/20% toluene-2,6-diisocyanate isomer blend) over a period of about one hour, with stirring. After an additional hour of stirring, the isocyanate concentration reached a substantially constant value of 0.39 meq/gm (theoretical=0.40 meq/gm). This prepolymer was designated Prepolymer G and had the following idealized average composition:

OCN—T—(CH$_2$CH$_2$O)$_{181}$CH$_2$CH$_2$—T—NCO

OCN—T—(CH$_2$CH$_2$O)$_{181}$CH$_2$CH$_2$—T—NCO

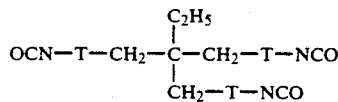

where T represents

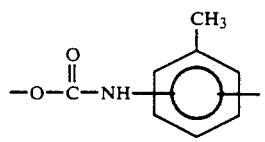

(the toluene diisocyanate urethane reaction moiety), and

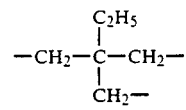

represents the trimethylolpropane reaction moiety. The calculated average composition of the Prepolymer G mixture comprised two moles of isocyanate-capped linear polymer of about 8350 MW for each mole of trifunctional isocyanate-capped crosslinker of about 656 MW. In effect, it is expected that when Prepolymer G is mixed with, and polymerized with, water or another aqueous liquid, it would react as though it has an effective molecular weight of about 17,000, or the sum of the weights of the three species depicted schematically above.

EXAMPLE VIII

Preparation of Prepolymer H

This prepolymer was prepared by heating to 60° C. a mixture of 0.04 moles homopolymer polyethylene glycol (~8000 MW) and 0.02 moles trimethylolpropane. The preheated mixture was added to 0.10 moles toluene diisocyanate (80% toluene-2,4-diisocyanate/20% toluene-2,6-diisocyanate isomer blend) over a period of about one hour, with stirring. The difference in concentration of ingredients yielded a different prepolymer than that obtained in Example VII. After an additional hour of stirring, the isocyanate concentration reached a substantially constant value of 0.20 meq/gm (theoretical=0.18 meq/gm). This prepolymer was designated Prepolymer H and had the following idealized average structure:

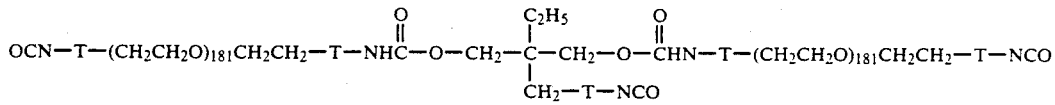

where T represents

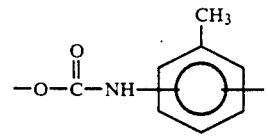

(the toluene diisocyanate urethane reaction moiety), and

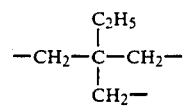

represents the trimethylolpropane reaction moiety. The calculated average molecular weight for Prepolymer H is about 17,000.

EXAMPLE IX

Preparation of Prepolymer J

A prepolymer was formed by repeating the preparation of Example I, except that the IPDI was replaced by an equivalent molar amount of toluene diisocyanate (80% toluene-2,4-diisocyanate/20% toluene-2,6-diisocyanate isomer blend). After heating for about seven hours, the isocyanate values reached 0.43 meq/gm (theoretical=0.40 meg/gm). This prepolymer, a liquid at room temperature, was designated Prepolymer J.

EXAMPLE X

Gelling Time

The rate of gel formation as a function of prepolymer-to-water ratio was investigated by mixing varying proportions of water and Prepolymer A and allowing the mixtures to stand at ambient temperatures with no further agitation. Table I shows the times required for gelling, which was determined by visual examination.

TABLE I

| Gelling Time as a Function of Prepolymer Concentration | | |
|---|---|---|
| Prepolymer:Water | % Prepolymer | Gelling Time (min) |
| 1:1 | 50.0 | 19.0 |
| 1:2 | 33.3 | 21.0 |
| 1:3 | 25.0 | 23.0 |
| 1:4 | 20.0 | 24.0 |
| 1:5 | 16.7 | 28.0 |
| 1:6 | 14.3 | 32.0 |
| 1:7 | 12.5 | 33.0 |
| 1:8 | 11.1 | 41.0 |
| 1:9 | 10.0 | 40.0 |
| 1:10 | 9.1 | 38.0 |
| 1:15 | 6.3 | 57.0 |
| 1:20 | 4.8 | 85.0 |

EXAMPLE XI

Resistance to Protein Binding

To demonstrate the ability of the hydrated polymers of this invention to resist nonspecific protein binding or adsorption, a protein adsorptive surface was coated with prepolymer, which then was polymerized. Silica was chosen as the surface to be coated due to its ability to bind large amounts of protein. One gram of silica (particle size=10.0 μm, surface area=250.0 m$^2$/gm) was placed in a glass fritted filtering funnel. Fifty milliliters of a 5.0% solution of Prepolymer A in dry methylene chloride was passed over the bed repeatedly, under vacuum, until all solvent had evaporated. The coated silica was dried at 25° C. under vacuum for 16 hours, then placed in water overnight at 25° C. to allow polymerization to occur.

To determine the extent of protein binding, one gram of uncoated silica (control) and one gram of silica coated with the hydrated polymer each were mixed with 10.0 ml of 1.0 mg/ml hemoglobin in phosphate buffered saline ("PBS") (0.05M sodium phosphate, pH 7.0, 0.3M sodium chloride) for one hour at 25° C. The control and coated silicas were collected by filtration and were washed with PBS until 50.0 ml of the wash buffer were collected for each silica sample. Protein determinations were performed on each wash solution using the BioRad dye binding assay (BioRad Laboratories). The uncoated silica control was found to bind all of the 10.0 mg protein added. Protein binding to the silica coated with the hydrated polymer of this invention was below the limits of detection for this assay. Coating a surface normally adsorptive to protein with a polymer of this invention therefore reduced protein binding by >99%.

EXAMPLE XII

Resistance to Protein Binding

Hydrated polymer coatings prepared from Prepolymers A-E were tested for resistance to protein binding. Silica (20–45 μm particle size; pore diameter=500 Å) was coated with each Prepolymer and polymerized as described in Example XI. Protein binding to the coated silica was determined by incubating 0.2 gm silica with 50.0 mg hemoglobin in 10.0 ml phosphate buffered saline (0.01M sodium phosphate, pH7) for one hour. The amount of hemoglobin bound to the polymer-coated silica then was measured using the BioRad dye binding reagent (BioRad Laboratories) in the presence of 80% sucrose in 0.05M sodium borate (pH 7.0). After five minutes, the absorbance at 595 mm was measured and compared with an uncoated silica control. The protein rejection shown in Table II was expressed as a percent of the control.

TABLE II

| Rejection of Protein Binding | |
|---|---|
| Prepolymer Coating | Rejection of Protein Binding, % |
| A | 96.0 |
| B | 99.9 |
| C | 97.8 |
| D | 92.1 |
| E | 98.7 |

EXAMPLE XIII

Hydrated Polymer Biocompatibility

Test samples of hydrated polymer were prepared by mixing ten parts (v/w) Dulbecco's Modified Eagle's Medium (DMEM) with one part Prepolymer A (see Example I). After mixing completely, several aliquots of the solution were transferred to 10 cm polystyrene petri dishes in such a manner that the entire surface was not covered but, rather, puddles or droplets were formed. The dishes were left at ambient temperatures for 30 minutes. After polymerization was complete, approximately 20% of the surface of each dish was covered with hydrated polymer. The dishes were sterilized by UV irradiation for 48 hours.

The cells used to test biocompatibility in this example were the LLC-PK$_1$ line (porcine kidney epithelial cell line obtained from American Type Culture Collection) which proliferate as a monolayer. At confluency, these cells cease proliferation and begin differentiation. The hallmark of differentiation by this cell line is the formation of domes, or raised groupings of cells, caused by accumulation of a fluid pocket under the cells as a result of vectorial transport of water and ions.

The petri dishes prepared above were inoculated with cells at near confluent densities in a suspension of culture medium (3:1 solution of DMEM:F12 cell culture medium) containing 1.0% fetal bovine serum and penicillin (100 IU/ml), streptomycin (100 μgm/ml) and amphotericin B (250 ngm/ml). The dishes were incubated at 37° C. After 24 hours, a monolayer of cells had spread on the polystyrene surface. No cells had attached to the hydrated polymer but cells were visible on the polystyrene surface just adjacent to the polymer. After one week of culture at 37° C., the hydrated polymer surface remained free of cells. Cells growing on the polystyrene surface appeared identical to those in control cultures (with no hydrated polymer) and exhibited dome formation. In the presence of cytotoxic substances, a zone of clearing or dead cells would be evident. It therefore is concluded that no toxic substances and/or inhibitors of cellular differentiation were present in the cultures containing the hydrated polymer.

EXAMPLE XIV

Polymer Cloud Point Temperatures

The hydrated polymers described herein for the preparation of contact lenses were subjected to heat treatment at increasing temperatures up to the boiling point of water, to determine the cloud point of the polymeric material, that is, the temperature at which the polymer begins to appear cloudy or opaque. For comparative purposes, other hydrated polyurethane polymers were subjected to the same treatment, demonstrating that only the high EO-content polymers used in this invention remain clear at the high temperatures associated with steam sterilization. The results are shown in Table III.

For purposes of this experiment, hydrated polymers were prepared by dissolving each prepolymer sample in five parts water and allowed to gel. The gels were then fully hydrated by soaking overnight in excess water. The hydrated polymers were gradually heated in a beaker of water and clouding was determined visually. The polyols were tested by gradually heating 20 wt. % solutions in water in a spectrophotometer while recording the absorbance at a visible wavelength. At the cloud point, the polymer or polyol precipitated, causing an apparent increase of the solution's absorbance due to scattering.

TABLE III

| Sample | Cloud Point Temperatures | |
| --- | --- | --- |
| | EO:PO | Cloud Point |
| Hydrated Polymers: | | |
| From Prepolymer A | 75:25 | 85° C. |
| From Prepolymer B | 100:0 | >100° C. |
| Comparative A | 13:87 | 30° C. |
| Comparative B | 25:75 | 35° C. |
| Comparative C | 44:56 | 65° C. |
| Polyols Used to Make: | | |
| Prepolymer A | 75:25 | 85° C. |
| Prepolymer B | 100:0 | >100° C. |
| Prepolymer C | 100:0 | >100° C. |
| Prepolymer D | 88:12 | >100° C. |
| Prepolymer E | 80:20 | >100° C. |

EXAMPLE XV

Preparation of Contact Lens

Prepolymer B (0.08 gm of a 50% solution in acetonitrile) was mixed with 0.2 gm water (5 parts based on the weight of the prepolymer) and introduced into a contact lens mold. The mold top was secured in place and allowed to stand at room temperature for 2.0 hours. The mold parts were separated and placed in water at room temperature for 17.0 hours. The resultant hydrated polymer contact lens, which was in the shape of the mold, was removed and stored in distilled water. The lens was transparent by visual observation.

EXAMPLE XVI

Preparation of Contact Lens

Hydrated polymers of this invention were prepared as films having the approximate geometry of contact lenses according to the following method. Solutions of Prepolymers A and B were prepared. Prepolymer A was dissolved in acetonitrile and in tetrahydrofuran in concentrations ranging from 15 to 50 wt. %; 15 wt. % was preferred. Prepolymer B was dissolved in dried tetrahydrofuran at a concentration of 15 wt. %. The solvent was dried using a molecular sieve. The respective prepolymer solutions were allowed to evaporate from a concave well. As the solvent slowly evaporated, atmospheric moisture served to cure the polymer. The hydrated polymers prepared in this Example exhibited approximately one-third the hydration potential as hydrated polymers made by mixing Prepolymer A with five parts water, instead of solvent (that is, the lens prepared in Example XV). Hydration potential was measured by drying the prepared lenses, weighing them, and then fully hydrating the lenses and re-weighing.

EXAMPLE XVII

Strength Test

The hydrated polymers prepared according to this invention exhibited excellent flexibility, strength and resilience when handled in either the dry or fully hydrated state. Lenses prepared in Example XVI from Prepolymers A and B were used in this Example. This test was performed by squeezing and rolling manually to simulate standard contact lens cleansing actions or by folding over and compressing forcefully (also done manually). There was no visually observable effect on the integrity of the lenses hydrated polymers of this invention when tested in this manner.

EXAMPLE XVIII

Resistance to Protein Binding

Polymers described in this invention were compared with those used commercially in soft contact lens formulations in terms of their ability to resist adsorption of protein from solution. Calf intestinal alkaline phosphatase was selected as the model protein for this study since adsorbance of this enzyme onto the polymer could be determined directly by immersion in a suitable substrate. The substrate chosen was p-nitrophenylphosphate, which becomes yellow after enzymatic hydrolysis by alkaline phosphatase, and can be monitored spectrophotometrically.

Films of each polymer were prepared. The comparative polymers, poly(hydroxyethylmethacrylate) (HEMA) and HEMA containing 10% methacrylic acid (MAA), were polymerized as films using hydrogen peroxide, overnight at 70° C. A film was prepared from Prepolymer A of Example I by the procedure of Example XVI.

Films of each polymer were fully hydrated in borate buffer (0.05M sodium borate, pH 8.0), then 1.0 cm squares were cut from the films. The squares were soaked for one hour in 5.0 ml of a solution of alkaline phosphatase 1.0 mg/ml in 0.05 sodium borate, pH. 8.0). The films (were then washed for a period of one hour in the same borate buffer (with fresh buffer every fifteen minutes) to remove loosely bound enzyme. The washed films were placed in the substrate solution (6.0 mM p-nitrophenylphosphate in 0.1M glycine, 1.0 mM $MgCl_2$, pH 10.4) at ambient temperature. Liquid samples were withdrawn at ten minute intervals and absorbance at 405 nm was measured. FIG. 1 is a plot of absorbance versus time for each of the polymers tested. This assay measures the rates of conversion of substrate to product, as indicated by the rates of color formation (measured by absorbance at 405 nm). The rate of color formation is directly proportional to the amount of alkaline phosphatase present. The hydrated polymer film of this invention (prepared from Prepolymer A) was superior to the HEMA and HEMA/MAA polymers in that only very small amounts of the test protein (alkaline phosphatase) were bound to the film. By contrast, the polymers conventionally used in the preparation of contact lenses adsorbed high levels of protein in this test.

EXAMPLE XIX

Gas Permeability

Thin films of hydrated polymer were prepared for determination of oxygen permeability as follows: Prepolymer A was dissolved in an equal weight of acetonitrile and poured between two glass plates separated by aluminum foil on two sides. One side was sealed with silicone and the remaining side left exposed to atmospheric moisture. After 10 hours at room temperature, the plates were separated and placed in water for 3 hours. The films were removed and stored in 0.01M sodium phosphate, pH 7.4, containing 0.15M sodium chloride. Thickness was measured using an electric thickness gauge, and water content was determined from refractive index readings taken with a Bausch and Lomb Abbe Refractometer.

The oxygen permeability was measured by single chamber polarographic analysis. The value for transmissibility which was obtained (Dk/1) was converted to permeability (Dk) using the measured thickness of the sample. Oxygen permeability at 35° C. was also calculated using the Fatt-Chaston equation, which is:

$$Dk = 2.00 \times 10^{-11} exp(0.0411 \times \% WC),$$

(International Contact Lens Clinic, Vol. 9, No. 2, pp 76–88 (1982)). The results are shown in Table IV. These results demonstrate that the oxygen permeability of these polymer films is similar to that of pure water, for which Dk is approximately $80 \times 10^{-11}$. This hydrated polymer shows high oxygen permeability, which is a desired and necessary property for extended wear contact lenses.

TABLE IV

| Sample | Thickness (mm) | Refractive Index | Water Content | Oxygen Permeability[1] Meas. | Oxygen Permeability[1] Calcu. |
|---|---|---|---|---|---|
| 1 | 0.650 | 1.3516 | 88% | $87 \times 10^{-11}$ | $73 \times 10^{-11}$ |
| 2 | 0.335 | 1.3435 | 93% | $59 \times 10^{-11}$ | $91 \times 10^{-11}$ |

[1]Units of permeability are $(cm^3/sec)(ml\ O_2/ml \times mm\ Hg)$.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

We claim:

1. In a process for producing an improved hydrophilic, biocompatible contact lens, the improvement comprising:
   (a) reacting together water and a prepolymer to form a hydrated polyurea-polyurethane gel, said prepolymer prepared by:
      (i) selecting diols or polyols, at least 75% of which are oxyethylene-based diols or polyols having molecular weights of about 7000 to about 30,000 and
      (ii) reacting said diols or polyols with polyisocyanate at an isocyanate-to-hydroxyl ratio of about 1.8 to about 2.2 so that essentially all hydroxyl groups of said diols or polyols are capped with polyisocyanate, and
   (b) preparing a hydrated contact lens from said polyurea-polyurethane polymer gel to obtain a lens having a surface which resists nonspecific protein adsorption.

2. The method of claim 1 in which said prepolymer is prepared in the presence of an aprotic, water-miscible solvent.

3. A method of producing a hydrophilic, biocompatible contact lens characterized by a surface which resists nonspecific protein binding, said method comprising:
   (a) preparing a prepolymer by
      (i) selecting diols or polyols, at least 75% of which are oxyethylene-based diols or polyols having molecular weights of about 7000 to about 30,000 and
      (ii) reacting said diols or polyols with polyisocyanate at an isocyanate-to-hydroxyl ratio of about 1.8 to about 2.2 so that essentially all hydroxyl groups of said diols or polyols are capped with polyisocyanate;
   (b) introducing the prepolymer into a contact lens mold;
   (c) reacting said prepolymer with a crosslinking agent in near stoichiometric amount to produce a polyureapolyurethane polymer molded gel;
   (d) hydrating the molded gel; and
   (e) preparing a hydrated contact lens from said molded gel to obtain a lens having a surface which resists nonspecific protein adsorption.

4. The method of claim 3 in which said hydrated contact lens is prepared by:
   (a) machining an individual contact lens blank from said hydrated molded gel; and
   (b) polishing said lens blank to obtain a hydrated contact lens having a surface which resists nonspecific protein adsorption.

5. The method of claim 3 in which said prepolymer is prepared in the presence of an aprotic, water-miscible solvent.

6. The method of claim 3 in which said crosslinking agent is selected from the group consisting of polyhydric alcohols, polyhydric amines, polyisocyanates and water.

7. The method of claim 6 in which said crosslinking agent is water.

8. The method of claim 7 in which the gelling and hydrating steps occur simultaneously.

* * * * *